United States Patent
Ogawa et al.

(10) Patent No.: US 8,911,567 B2
(45) Date of Patent: Dec. 16, 2014

(54) HIGH-STRENGTH STEEL SHEET HAVING EXCELLENT PROCESSABILITY AND PAINT BAKE HARDENABILITY, AND METHOD FOR PRODUCING OF HIGH-STRENGTH STEEL SHEET

(75) Inventors: Toshio Ogawa, Tokyo (JP); Naoki Matsutani, Tokyo (JP); Koichi Goto, Tokyo (JP); Shinichiro Watanabe, Tokyo (JP); Nobuhiro Fujita, Tokyo (JP); Toshiki Nonaka, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 101 days.

(21) Appl. No.: 13/508,407

(22) PCT Filed: Nov. 9, 2010

(86) PCT No.: PCT/JP2010/069940
§ 371 (c)(1),
(2), (4) Date: May 7, 2012

(87) PCT Pub. No.: WO2011/055844
PCT Pub. Date: May 12, 2011

(65) Prior Publication Data
US 2012/0282487 A1 Nov. 8, 2012

(30) Foreign Application Priority Data
Nov. 9, 2009 (JP) ............................... P2009-255726

(51) Int. Cl.
*C22C 38/06* (2006.01)
*C22C 38/18* (2006.01)
(Continued)

(52) U.S. Cl.
CPC ............... *C23C 2/02* (2013.01); *C21D 8/0426* (2013.01); *C21D 8/0463* (2013.01); *C22C 38/001* (2013.01); *C22C 38/02* (2013.01); *C22C 38/04* (2013.01); *C22C 38/06* (2013.01); *C22C 38/18* (2013.01); *C23C 2/26* (2013.01); *C23C 2/28* (2013.01); *C21D 8/0431* (2013.01); *C21D 8/0436* (2013.01); *C21D 2211/005* (2013.01); *C21D 2211/008* (2013.01)
USPC ........... 148/333; 148/330; 148/334; 148/335; 148/533; 148/652; 428/659

(58) Field of Classification Search
CPC ........ C22C 38/04; C22C 38/06; C22C 38/18; C22C 38/40; C21D 2211/00; B32B 15/013
USPC .................... 148/330, 333–336, 533; 428/659
See application file for complete search history.

(56) References Cited

U.S. PATENT DOCUMENTS

| 4,808,231 A | 2/1989 | Kondis et al. |
| 2003/0111144 A1 | 6/2003 | Matsuoka et al. |
| 2010/0330392 A1* | 12/2010 | Ono et al. ...................... 428/659 |

FOREIGN PATENT DOCUMENTS

| JP | 6-73497 A | 3/1994 |
| JP | 2000-109965 A | 4/2000 |

(Continued)

OTHER PUBLICATIONS

Chinese Office Action, dated Jun. 26, 2013, for Chinese Application No. 201080049861.9.

(Continued)

*Primary Examiner* — Deborah Yee
(74) *Attorney, Agent, or Firm* — Birch, Stewart, Kolasch & Birch, LLP (57) ABSTRACT

The high-strength steel sheet includes, by mass %: C: 0.01% to 0.10%; Si: 0.15% or less; Mn: 0.80% to 1.80%; P: 0.10% or less; S: 0.015% or less; Al: 0.10% to 0.80%; Cr: 0.01% to 1.50%; N: 0.0100% or less; and a balance consisting of iron and inevitable impurities, in which a metallic structure is composed of ferrite and a hard second phase, the area fraction of the ferrite is 80% or more, the area fraction of the hard second phase is 1% to 20%, the fraction of unrecrystallized ferrite in the ferrite is less than 10%, the ferrite grain sizes are 5 μm to 20 μm, and the fraction of the ferrite crystal grains having an aspect ratio of 1.2 or less in the entire ferrite crystal grains is 60% or more.

27 Claims, 2 Drawing Sheets (51) Int. Cl.
*C21D 8/02* (2006.01)
*C23C 2/02* (2006.01)
*C21D 8/04* (2006.01)
*C22C 38/00* (2006.01)
*C22C 38/02* (2006.01)
*C22C 38/04* (2006.01)
*C23C 2/26* (2006.01)
*C23C 2/28* (2006.01)

(56) References Cited

FOREIGN PATENT DOCUMENTS

| | | |
|---|---|---|
| JP | 2001-303184 A | 10/2001 |
| JP | 2002-322537 A | 11/2002 |
| JP | 2003-138317 A | 5/2003 |
| JP | 2005-281867 A | 10/2005 |
| JP | 2007-107099 A | 4/2007 |
| JP | 2008-19502 A | 1/2008 |
| JP | 2008-106350 A | 5/2008 |
| JP | 2008-110387 A | 5/2008 |
| JP | 2009-19231 A | 1/2009 |
| JP | 2009-35815 A | 2/2009 |
| JP | 2009-35816 A | 2/2009 |
| MX | 166384 A | 1/1993 |
| WO | WO 2009/008551 A1 * | 1/2009 |

OTHER PUBLICATIONS

Mexican Office Action, dated Jun. 11, 2013, for Mexican Application No. MX/a/2012/005344.

International Search Report issued in PCT/JP2010/069940, dated Jan. 25, 2011.

* cited by examiner

HIGH-STRENGTH STEEL SHEET HAVING EXCELLENT PROCESSABILITY AND PAINT BAKE HARDENABILITY, AND METHOD FOR PRODUCING OF HIGH-STRENGTH STEEL SHEET

FIELD OF THE INVENTION

The present invention relates to a high-strength steel sheet having excellent processability and paint bake hardenability which is preferred for use of an automobile steel sheet, particularly, use of an outer panel, and a method for producing the same.

Priority is claimed on Japanese Patent Application No. 2009-255726, filed Nov. 9, 2009, the content of which is incorporated herein by reference.

RELATED ART

Efforts are being made to reduce the weight of the body of automobiles to improve the gasoline mileage so as to suppress the amount of carbon dioxide exhausted. Therefore, a high-strength steel sheet whose thickness can be reduced is being increasingly applied to automobile members. In addition, a high-strength steel sheet has also become widely used for an automobile body in order to secure passenger safety.

Among them, a steel sheet having a tensile strength of approximately 340 MPa is in practical use for use in panel members, particularly, outer panels. Recently, for the purpose of reducing the weight by means of an additional increase in the strength of an outer panel, there is a demand for a steel sheet having a high strength of 390 MPa to 500 MPa and having excellent press moldability and surface quality.

However, generally, an increase in the tensile strength is followed by an increase in the yield strength and a decrease in the ductility; therefore the processability, particularly, press moldability is impaired. As a result, as an index for maintaining the processability while holding the strength, there is a demand for the product of the tensile strength TS [MPa] and the total elongation EL [%], that is, TS×El [MPa·%] to be 17000 or more [MPa·%]. It is known that the yield strength and the yield ratio are important factors in attaining the above demand. The yield strength and the yield ratio have a strong correlation with the processability, particularly, press moldability, and, the yield strength and the yield ratio need to be 270 MPa or less and 0.55 or less respectively in order to mold an outer panel. In addition, since the edge portions of an outer panel are often subjected to a hemming process, the outer panel also needs to be excellent in terms of tight bending processability.

As a steel material that satisfies both strength and processability requirements, dual phase steel (hereinafter referred to as the DP steel) having a complex structure composed of a hard second phase including ferrite and martensite as the main components is known. The DP steel has a low yield strength and an excellent ductility.

On the other hand, increasing the yield strength of a member using a paint baking treatment after press molding is effective in improving the dent resistance. Therefore, there is a demand for improvement in the paint bake hardenability (hereinafter referred to as the BH) in order to satisfy both the moldability and the dent resistance. The BH is a characteristic that develops through a so-called strain aging phenomenon in which carbon atoms, nitrogen atoms, and the like are fixed to dislocations introduced by a heat treatment at a low temperature, such as a paint baking treatment, during molding, and carbonitrides are precipitated.

For example, Patent Documents 1 to 3 propose DP steel sheets having excellent processability. However, the steel sheet as proposed in Patent Document 1 has a low yield strength, but the product of the tensile strength and the total elongation, that is, the strength-ductility balance TS×E1 is not sufficient. In addition, the steel sheet as proposed in Patent Document 2 has a low yield strength, and also has excellent strength-ductility balance, but there is a problem in that the steel sheet has to be held at a high temperature for a long time in an annealing process such that degradation of the productivity is caused. Furthermore, the steel sheets as proposed in Patent Documents 1 and 2 are not produced in consideration of the dent resistance after any of press molding and a paint baking treatment is carried out. In addition, the steel sheet proposed in Patent Document 3 has excellent dent resistance, and also a low yield strength, but the product of the tensile strength and the total elongation, that is, the strength-ductility balance TS×E1 is not sufficient.

In addition, the steel sheets as proposed in Patent Documents 4 and 5 have a high yield strength, but the processability is not sufficient.

In addition, in the steel sheet as proposed in Patent Document 6, the area fraction of unrecrystallized ferrite is intentionally increased by adjusting the rate of temperature rise during annealing.

REFERENCE DOCUMENTS

Patent Documents

[Patent Document 1] Japanese Unexamined Patent Application, First Publication No. 2001-303184
[Patent Document 2] Japanese Unexamined Patent Application, First Publication No. 2000-109965
[Patent Document 3] Japanese Unexamined Patent Application, First Publication No. 2005-281867
[Patent Document 4] Japanese Unexamined Patent Application, First Publication No. H6-73497
[Patent Document 5] Japanese Unexamined Patent Application, First Publication No. 2003-138317
[Patent Document 6] Japanese Unexamined Patent Application, First Publication No. 2008-106350

SUMMARY OF THE INVENTION

Problems to be Solved by the Invention

An object of the present invention is to stably provide a steel sheet that has a tensile strength of 390 MPa to 500 MPa, and also has excellent processability and, furthermore, paint bake hardenability without impairing the productivity.

Methods for Solving the Problem

In order to achieve the above object, the configurations and methods of the respective aspects of the present invention are as follows:

(1) A high-strength steel sheet according to an aspect of the present invention includes, by mass %, C: 0.01% to 0.10%; Si: 0.15% or less; Mn: 0.80% to 1.80%; P: 0.10% or less; S: 0.015% or less; Al: 0.10% to 0.80%; Cr: 0.01% to 1.50%; and N: 0.0100% or less and a balance consisting of iron and unavoidable impurities, in which a metallic structure is composed of ferrite and a hard second phase, an area fraction of the ferrite is 80% or more, an area fraction of the hard second phase is 1% to 20%, a fraction of unrecrystallized ferrite in the ferrite is less than 10%, a ferrite grain sizes are 5 μm to 20 μm, and a fraction of the ferrite crystal grains having an aspect ratio of 1.2 or less in entire ferrite crystal grains is 60% or more.

(2) In the high-strength steel sheet according to the above (1), a component composition of the high-strength steel sheet may satisfy that Mn/Cr is 3.0 or less, and Cr/(Si+Al) is 3.0 or less.

(3) The high-strength steel sheet according to the above (1) or (2) may further include, by mass %, one or more of: Nb: 0.0005% to 0.0500%; Ti: 0.0005% to 0.0500%; Mo: 0.005% to 1.500%; W: 0.005% to 1.500%; B: 0.0001% to 0.0100%; Ni: 0.005% to 1.500%; Cu: 0.005% to 1.500%; and V: 0.005% to 1.500%.

(4) In the high-strength steel sheet according to any one of the above (1) to (3), a molten zinc coat or a molten zinc alloy coat may be provided at the surface of the high-strength steel sheet.

(5) The high-strength steel sheet according to the above (4) may further include Cr: 0.20% to 1.50%, and P: less than 0.015%.

(6) In a method for producing the high-strength steel sheet according to an aspect of the present invention, a billet having the chemical components of the high-strength steel sheet according any one of the above (1) to (3) is hot rolled, pickled, cold rolled at a percentage reduction in thickness of more than 60% so as to obtain a steel sheet, then, the steel sheet is heated to a temperature range of 720° C. to 850° C. at a heating rate controlled to 1° C./s to 10° C./s in a temperature range of an Ac1 transformation point to an Ac3 transformation point, subjected to an annealing for a retention time of 10 seconds to 200 seconds during which the temperature of the steel sheet is 720° C. to 850° C., and after the annealing, subjected to a first cooling to 500° C. or lower at a cooling rate of 3° C./s or more, and then subjected to a skin pass rolling of 2.0% or less.

(7) In the method for producing the high-strength steel sheet according to the above (6), a heat treatment may be carried out in a temperature range of 200° C. to 450° C. for 30 seconds or more before the skin pass rolling, and a second cooling may be carried out at a cooling rate of 1° C./s to 3° C./s to 100° C. or lower after the heat treatment.

(8) In the method for producing the high-strength steel sheet according to the above (6), galvanization may be carried out on the steel sheet after the first cooling and before the skin pass rolling.

(9) In the method for producing the high-strength steel sheet according to the above (8), a heat treatment for alloying may be carried out for 10 seconds or longer in a temperature range of 450° C. to 600° C. at a timing after the galvanization and before the skin pass rolling.

(10) In the method for producing the high-strength steel sheet according to the above (7), galvanization may be carried out on the steel sheet at a timing after the heat treatment and before the second cooling.

(11) In the method for producing the high-strength steel sheet according to the above (10), a heat treatment for alloying may be carried out for 10 seconds or longer in a temperature range of 450° C. to 600° C. at a timing after the galvanization and before the second cooling.

Effects of the Invention

According to the respective aspects of the present invention, it is possible to provide a steel sheet that has a tensile strength of 390 MPa to 500 MPa, has low yield strength and yield ratio, has excellent strength-ductility balance, and has paint bake hardenability.

In the high-strength steel sheets of the respective aspects of the present invention and the methods for producing the same, an uneven structure hardness, which is a cause of occurrence of streaky recess and protrusion surface defects, is suppressed. As a result, it is possible to stably suppress occurrence of streaky recess and protrusion surface defects and to significantly improve the yield of high-strength steel sheet production.

DETAILED DESCRIPTION OF THE INVENTION

When the residual percentage of hard structures, such as unrecrystallized ferrite and martensite, is high, the hardness of a steel sheet structure becomes uneven. When the steel sheet is press-molded, plastic deformation locally starts from portions having a relatively low hardness. As a result, marks of streaky recess and protrusion are generated on the surface of the steel sheet. For a steel sheet that is used for an automobile outer sheet and the like, the aesthetic appearance of the surface is important, and therefore the streaky recess and protrusion surface defects are considered as serious defects, and a significant decrease in the yield is caused.

As described below, in the high-strength steel sheets according to the respective embodiments of the present invention and methods for producing the same, an uneven structure hardness, which is a cause of occurrence of streaky recess and protrusion surface defects, is suppressed. As a result, occurrence of streaky recess and protrusion surface defects can be stably suppressed.

In addition, the present inventors studied the component compositions and microstructures of steel sheets, and, furthermore, methods for producing steel sheets in order to improve both the processability and the paint bake hardenability of a high-strength steel sheet. As a result, the inventors paid attention to the ratio of the added amount between Mn and Cr, which are elements that increase the hardenability, that is, optimization of a Mn/Cr ratio, and, furthermore, Al, which is an element that promotes generation of ferrite and concentrates C in austenite, and found that both the processability and the paint bake hardenability of a high-strength steel sheet are improved by optimizing the ratio of the added amount between Cr and (Si+Al), that is, the ratio of Cr/(Si+Al).

Hereinafter, the embodiments of the present invention will be described in detail.

Firstly, reasons why the steel components are limited in the present invention will be described. In the following description, the amounts of the components are indicated by % by weight unless otherwise described.

C is an element that promotes generation of martensite, contributes to an increase in the tensile strength and a decrease in the yield strength, and increases the yield strength when a paint baking treatment is carried out after molding, thereby enhancing the dent resistance of a panel member. An appropriate amount of C is added depending on a target steel strength.

The lower limit of the C amount is 0.01% or more in order to secure a sufficient amount of martensite, and obtain target tensile strength, yield strength, and BH. The lower limit of the C amount is more preferably 0.03% or more, and still more preferably 0.05% or more in a case in which a particularly high strength is required.

The upper limit of the C amount is 0.10% in order to suppress the yield strength and secure sufficient press moldability. The upper limit of the C amount is more preferably 0.08% or less, and still more preferably 0.07% or less in a case in which particularly favorable press moldability is required.

Si is an element that is, sometimes, added for deoxidization. In order to obtain the effects as described in the present specification, the Si amount may be 0%, and the lower limit of the Si amount may be undefined. However, production costs are increased to set the Si amount to less than 0.01%, and therefore the lower limit of the Si amount is preferably 0.01%. In order to prevent cracking during a tight bending process and prevent the aspect ratio of ferrite crystal grains from increasing, the upper limit of the Si amount is set to 0.15% or less, preferably 0.10% or less, and more preferably 0.05% or less.

Mn has an action of increasing the strength as an element that contributes to solid solution strengthening, and is thus effective in obtaining martensite. Therefore, it is necessary to include 0.80% or more of Mn. In order to obtain martensite more stably, 1.0% or more of Mn is preferably included. On the other hand, when the Mn amount exceeds 1.80%, occurrence of streaky recess and protrusion surface defects is more likely, both the tensile strength and the yield strength are increased, and deterioration of the press moldability is caused, and therefore the upper limit is set to 1.80%. In order to further decrease the yield strength and sufficiently secure the press moldability, the upper limit of the Mn amount is preferably set to 1.50%.

P is an impurity, and segregated at grain boundaries so as to cause degradation of the toughness or deterioration of the weldability of a steel sheet. Under ordinary production conditions, 0.0005% or more of P is included. Furthermore, an alloying reaction becomes extremely slow during galvanization, and the productivity is degraded. From the above viewpoint, the upper limit of the P amount is set to 0.10% or less. In order to further reduce the segregation of P, the P amount is more preferably set to 0.05% or less, and still more preferably set to 0.015% or less. The lower limit is not particularly limited, but P is an element that can increase the strength at low cost, and therefore the P amount is preferably set to 0.005% or more.

S is included in a steel sheet as an impurity, and, under ordinary production conditions, 0.0005% or more of S is included. When the S amount exceeds 0.015%, hot cracking is induced, and the processability deteriorates, and therefore the S amount is set to 0.015% or less. In a case in which the favorable processability is required, the S amount is preferably set to 0.012% or less, and more preferably set to 0.010% or less.

Al is an extremely important element in the present invention. Similarly to Si, Al is a ferrite-stabilizing element, but Al is an important element that promotes generation of ferrite without degrading the coat wetting properties and concentrates C in austenite, thereby securing martensite. In order to obtain the above effects, the Al amount needs to be set to 0.10% or more. In order to more stably obtain martensite, the Al amount preferably exceeds 0.20%. Also, addition of excess Al not only saturates the above effects, but also causes an excessive increase in alloying costs. Due to the above reasons, the Al amount needs to be set to 0.80% or less. In a case in which there is a strong demand for suppression of the costs, the Al amount is more preferably set to 0.50% or less and still more preferably 0.30% or less.

Cr is an extremely important element in the present invention. Cr contributes to solid solution strengthening, and has an action of increasing the strength of a steel sheet. Also, addition of Cr is also effective in obtaining a sufficient amount of martensite. Therefore, it is necessary to include 0.01% or more of Cr in a steel sheet. In order to obtain a sufficient amount of martensite more stably even in a case in which galvanization is carried out, or, furthermore, an alloying treatment is carried out, the Cr amount is preferably set to 0.10% or more, and the Cr amount is more preferably 0.20% or more. On the other hand, when the Cr amount exceeds 1.50%, both the tensile strength and the yield strength are increased, and deterioration of the press moldability is caused. Therefore, the Cr amount is set to 1.50% or less. In order to further decrease the yield strength and sufficiently secure the press moldability, the Cr amount is preferably set to 1.00% or less, the Cr amount is more preferably set to 0.40% or less, and the Cr amount is particularly preferably set to less than 0.20% in order to reduce alloying costs in a case in which galvanization is not carried out.

N does not necessarily need to be added, but is included in a steel sheet as an impurity. When the N amount exceeds 0.0100%, the toughness or ductility significantly deteriorates, and cracking of billets significantly occurs. Therefore, in order to obtain the sufficient processability of a steel sheet, the N amount is set to 0.0100% or less. In order to obtain more favorable processability, the N amount is preferably set to 0.0050% or less, and more preferably set to 0.0030% or less. It is not particularly necessary to define the lower limit value of the N amount, but the N amount is 0.0005% or more in an ordinary steel sheet.

Meanwhile, since addition of N is effective in obtaining martensite, N may be actively added at an upper limit of the N amount set to 0.0100%.

Furthermore, either or both of Nb and Ti may be contained. Nb and Ti are elements that suppress the grain growth of ferrite in an annealing process after cold rolling so as to contribute to crystal grain refinement strengthening. In order to obtain such an effect, either or both of Nb and Ti are preferably added at a lower limit set to 0.0005% or more respectively. On the other hand, when the contents of either or both of Nb and Ti exceed 0.0500%, recrystallization of ferrite is significantly suppressed, and unrecrystallized ferrite remains so as to increase the yield strength, and therefore the respective upper limits are preferably set to 0.0500% or less. In addition, a preferable upper limit of the contents of either or both of Nb and Ti is 0.0400% from the viewpoint of alloying costs.

All of Mo, W, B, Ni, Cu, and V are elements that increase the hardenability, and one or more of them may be added according to necessity. The effects of the embodiments of the present invention are not impaired when any of Mo, W, Ni, Cu, and V are not actively added, and are inevitably mixed in steel in a range of 0.0000% to 0.0005%. In addition, the effects of the embodiments of the present invention are not impaired when any of Mo, W, Ni, Cu, and V are added or mixed in steel in a range of 0.0005% to 1.5000%. On the other hand, in order to obtain the effect of strength improvement through active addition, the respective elements are preferably added at 0.100% or more. On the other hand, since excessive addition causes an increase in alloying costs, the upper limits of the amounts of the respective elements added are preferably set to 1.500% or less.

The effects of the embodiments of the present invention are not impaired when B is not actively added, and is inevitably mixed in steel in a range of 0.0000% to 0.0001%. In addition, the effects of the embodiments of the present invention are not impaired when B is added or mixed in steel in a range of 0.0001% to 0.0100%. On the other hand, in order to obtain the effect of strength improvement through active addition, B is preferably added at 0.0001% or more. On the other hand, since excessive addition causes an increase in alloying costs, the upper limits of the added amounts is preferably set to 0.0100% or less.

Next, reasons why the production method is limited will be described.

A billet provided for hot rolling may be produced by an ordinary method, and may be molten or cast into steel. From the viewpoint of the productivity, continuous casting is preferred, and steel may be produced using a thin slab caster or the like. In addition, the production method may be a process of continuous casting and direct rolling in which hot rolling is carried out immediately after casting. The hot rolling may be carried out by an ordinary method, and the conditions, such as the rolling temperature, the percentage reduction in thickness, the cooling rate, and the winding temperature, are not particularly defined. After the hot rolling, the steel sheet is pickled, cold rolled, and annealed so as to be made into a cold-rolled steel sheet.

In a case in which the percentage reduction in thickness of the cold rolling is 60% or less, recrystallization is delayed during the annealing, and unrecrystallized ferrite becomes liable to remain after the annealing such that there are cases in which the yield strength and the yield ratio are increased, and the press moldability is deteriorated. Therefore, the percentage reduction in thickness of the cold rolling is set to a range of more than 60% in the present embodiments. The percentage reduction in thickness of the cold rolling is more preferably more than 65%, still more preferably more than 70%, and still more preferably more than 75%. On the other hand, when the percentage reduction in thickness of the cold rolling becomes more than 90%, the load on the rolling rolls is increased. Therefore, the percentage reduction in thickness of the cold rolling is preferably 90% or less. In a case in which there is a demand for more economical operation of the rolling rolls, the percentage reduction in thickness of the cold rolling is preferably 80% or less.

Figure 3:
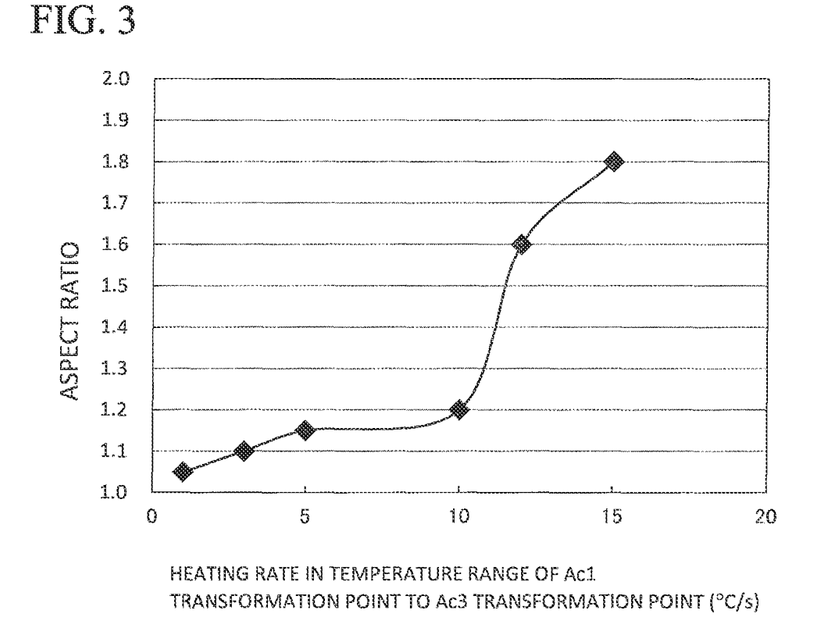
FIG. 3 is a view showing the relationship between a heating rate in a temperature range of an $Ac_1$ transformation point to an Ac3 transformation point and an aspect ratio of ferrite crystal grains.

The annealing is preferably carried out using a continuous annealing facility in order to control the heating rate and the heating time. In the continuous annealing, it is important to appropriately adjust the heating rate in a temperature range of the $Ac_1$ transformation point to the Ac3 transformation point of a steel sheet. The heating rate makes the aspect ratio of ferrite crystal grains after the annealing vary as shown in FIG. 3. When the heating rate is 10° C./s or less, the average aspect ratio of ferrite crystal grains is 1.2 or less, and the ferrite crystal grains having an aspect ratio of 1.2 or less accounts for 60% or more of the entire crystal grains. As a result, the uneven hardness of the steel sheet structure is reduced, and a likelihood of streaky recess and protrusion surface defects occurring during the press molding is decreased. In the above temperature range, in a case in which the heating rate is less than 1° C./s during the annealing, the productivity is degraded, and the ferrite crystal grains grow more than necessary such that the ferrite crystal grains are coarsened, and degradation of the tensile strength is caused. Therefore, in the above temperature range, the heating rate is set to at least 1° C./s or more. In order to more stably suppress the growth of the grain size, the heating rate is set to more than 3° C./s. On the other hand, when the heating rate becomes 10° C./s or more in the above temperature range, recrystallization of ferrite is significantly suppressed, and therefore unrecrystallized ferrite remains after the annealing, and the yield strength is increased. Therefore, the heating rate is set to less than 10° C./s in the above temperature range. In a case in which more favorable moldability is required, the heating rate is preferably set to 8° C./s or less, and more preferably set to 6° C./s or less.

Meanwhile, the $Ac_1$ transformation points and the Ac3 transformation points in the respective steel sheets can be estimated by a known method using the component composition of steel.

Furthermore, the lower limit of the peak temperature during the annealing is set to 720° C. or more, and the upper limit is set to 850° C. In a case in which the peak temperature is lower than 720° C., since ferrite does not transform into austenite, the amount of martensite is not sufficient, and a decrease in the tensile strength and an increase in the yield ratio are caused. On the other hand, when the peak temperature becomes higher than 850° C., since austenite transformation proceeds excessively, the amount of a hard second phase increases, and the amount of ferrite decreases, thereby causing a decrease in the ductility and an increase in the yield ratio. The range of the peak temperature that is more preferable to obtain the above effect more stably is 770° C. to 830° C.

In addition, the retention time is set to 10 seconds to 200 seconds in a temperature range in which the temperature of the steel sheet is 720° C. or higher. When the time in which the temperature of the steel sheet is 720° C. or higher is less than 10 seconds, since transformation from ferrite to austenite does not proceed sufficiently, martensite cannot be secured sufficiently, and a decrease in the tensile strength and an increase in the yield ratio are caused. On the other hand, when the retention time at 720° C. or higher is increased, since degradation of the productivity is caused, the retention time in the above temperature range is set to 200 seconds or less. The retention time in a temperature range of 720° C. or higher is preferably 150 seconds or less, and more preferably 120 seconds or less in order to obtain the above effects more stably.

In addition, after the annealing, first cooling for cooling the steel to 500° C. or lower is carried out. At this time, in a case in which the cooling rate is less than 3° C./s, there are cases in which martensite cannot be sufficiently obtained. From the above viewpoint, the lower limit of the cooling rate is set to 3° C./s. On the other hand, since a special facility needs to be introduced and the like in order to set the cooling rate to higher than 250° C./s, the upper limit of the cooling rate is preferably set to 250° C./s. The cooling rate after the annealing may be appropriately controlled through spraying of a coolant, such as water, air blowing, or forcible cooling using mist or the like.

In a case in which zinc galvanization or zinc alloy galvanization is carried out after the cooling, the galvanization is carried out after the above first cooling and before the temper rolling as described below (skin pass rolling). The composition of the zinc coat is not particularly defined, and, in addition to Zn, Fe, Al, Mn, Cr, Mg, Pb, Sn, Ni, and the like may be added according to necessary. Meanwhile, the galvanization may be carried out as a separate process from the annealing, but is preferably carried out through a continuous annealing and galvanization line in which annealing and galvanization are carried out continuously from the viewpoint of the productivity.

In a case in which an alloying treatment is carried out on the above galvanization coat, the alloying treatment is preferably carried out in a temperature range of 450° C. to 600° C. at a timing after the galvanization and before the skin pass rolling. Alloying does not proceed sufficiently at lower than 450° C. In addition, alloying proceeds excessively at higher than 600° C. such that a problem may be induced in which the galvanized layer is embrittled, and the coat is peeled off due to a process of pressing or the like. The time of the alloying treatment is preferably 10 seconds or more since alloying does not proceed sufficiently with a time of less than 10 seconds. In addition, the upper limit of the time of the alloying treatment is not particularly defined, but is preferably 100 seconds or less from the viewpoint of the production efficiency.

In addition, from the viewpoint of the productivity, it is preferable that an alloying treatment furnace be continuously provided in the continuous annealing and galvanization line, and the annealing, the galvanization, and the alloying treatment be continuously carried out.

The temper rolling (skin pass rolling, SPM) is carried out to correct the shape and secure the surface properties, and preferably carried out in a range of the elongation percentage of 2.0% or less. This is because the BH amount is decreased when the elongation percentage exceeds 2.0%.

A heat treatment (overaging treatment) may be carried out for 30 seconds or more in a temperature range of 200° C. to 450° C. before the skin pass rolling. In this case, a second cooling is carried out after the overaging treatment.

The steel sheet is cooled to 100° C. or lower through the second cooling under conditions of a cooling rate of 1° C./s to 3° C./s. When the secondary cooling rate is less than 1° C./s, since the productivity decreases, the amount of the hard second phase (particularly martensite) obtained is reduced so as to increase the yield ratio, and there is a case in which the press moldability is deteriorated, the lower limit is set to 1° C./s or more. In addition, when the second cooling rate exceeds 3° C./s, since the amount of the obtained hard second phase becomes excessive, both the tensile strength and the yield strength are increased so as to increase the yield ratio, and there is a case in which the press moldability is deteriorated, the upper limit is set to 3° C./s or less.

Figure 1:
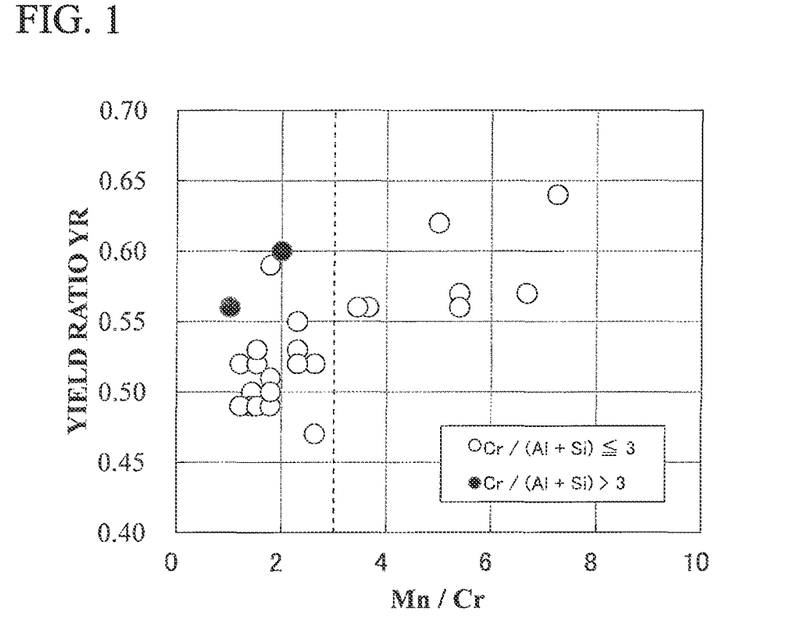
FIG. 1 is a view showing the correlation between an Mn/Cr ratio and a yield ratio YR.
Figure 2:
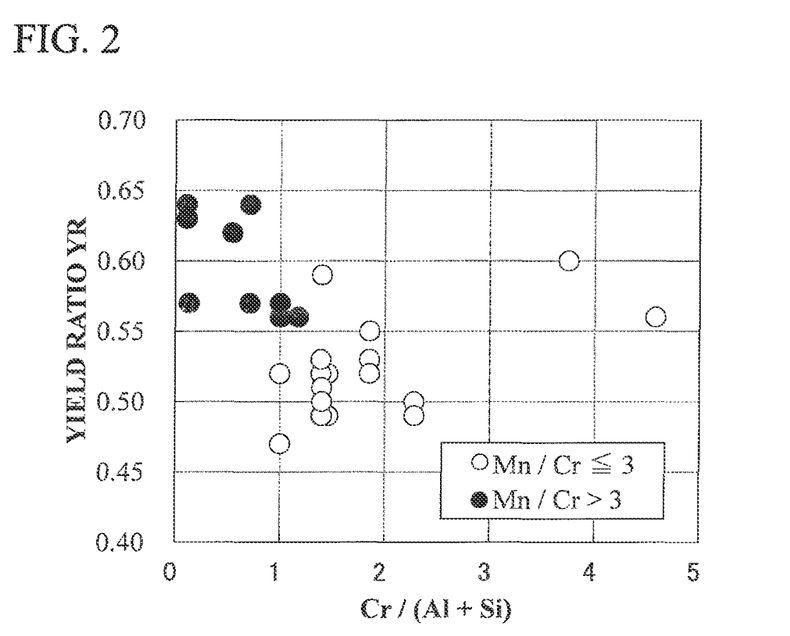
FIG. 2 is a view showing the correlation between a Cr/(Si+Al) ratio and the yield ratio YR.

FIGS. 1 and 2 show the numerical values of the yield ratios YR with respect to the Mn/Cr ratio and the Cr/(Si+Al) ratio respectively. The yield ratio (YR) refers to a value that indicates the ratio of the yield strength (YP) to the tensile strength (TS), and YR is equal to YP/TS. Meanwhile, the tensile characteristics are measured by a tensile test as defined in JIS Z 2241, and El [%] refers to the breaking elongation. In addition, in the tensile test, in a case in which a yield phenomenon is shown, the top yield point is considered as the yield strength in the evaluation, and, in a case in which a yield phenomenon is not shown, the 0.2% proof test is considered as the yield strength in the evaluation.

As is clear from FIGS. 1 and 2, as the Mn/Cr ratio and the Cr/(Si+Al) ratio are decreased, the yield strength is degraded, and the processability is improved. The cause of the phenomenon is not clear. Setting the Mn/Cr ratio and the Cr/(Si+Al) ratio in an appropriate range is extremely important for the reduction of the yield ratio, and the above described yield ratio becomes 0.55 or less when the Mn/Cr is in a range of 3.0 or less, and the Cr/(Si+Al) is in a range of 3.0 or less.

Next, the metallic structure will be described.

The microstructure of the steel sheet obtained by the present invention is composed of ferrite and a hard second phase (a structure other than ferrite).

When the area fraction of the ferrite is less than 80%, the hard second phase increases such that the yield strength and the yield ratio increases, and the processability, particularly, the press moldability deteriorates. Therefore, the lower limit of the area fraction of the ferrite was set to 80% or more.

Figure 4:
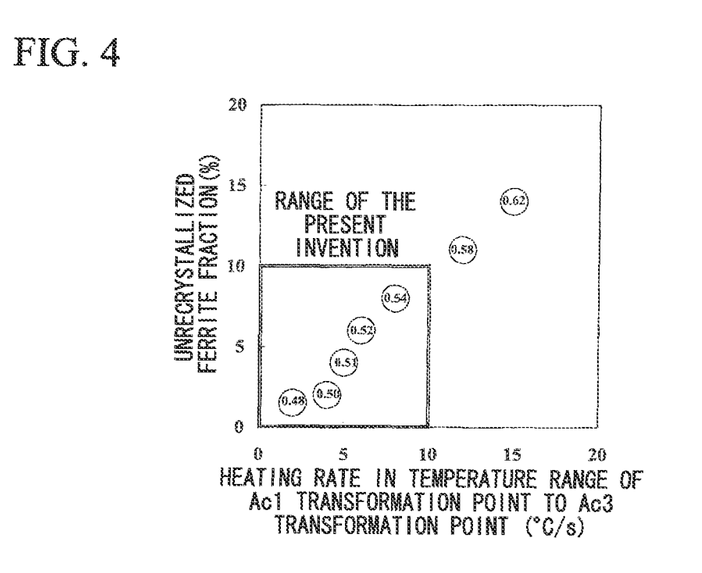
FIG. 4 is a view showing the heating rate in the temperature range of the $Ac_1$ transformation point to the Ac3 transformation point and an appropriate range of unrecrystallized ferrite fraction.

FIG. 4 shows the numerical values of the respective yield ratios YR with respect to the ratios of the area fractions of unrecrystallized ferrite to the heating rate from the Ac1 transformation point to the Ac3 transformation point during the continuous annealing. It is clear from FIG. 4 that setting the heating rate in an appropriate range and controlling the area fraction of unrecrystallized ferrite are extremely important for reduction of the yield ratio. When the area fraction of unrecrystallized ferrite in the ferrite exceeds 10%, the yield strength and the yield ratio are increased, and there is a case in which the press moldability deteriorates. Therefore, the area fraction of unrecrystallized ferrite was set to 10% or less. It is clear from FIG. 4 that the heating rate needs to be set to less than 10° C./s in order to obtain such an area fraction of unrecrystallized ferrite.

Meanwhile, the unrecrystallized ferrite, ferrite other than the unrecrystallized ferrite, that is, recrystallized ferrite (ferrite recrystallized during heating for the annealing), and transformed ferrite (ferrite that is transformed from austenite during cooling after the annealing) can be differentiated by analyzing the measurement data of the crystal orientation of an electron back scattering pattern (referred to as the EBSP) by the Kernel Average Misorientation method (KAM method).

In the grains of the unrecrystallized ferrite, dislocations are recovered, but a continuous change in the crystal orientation, which is caused by plastic deformation during the cold rolling, is present. On the other hand, the change in the crystal orientation in the grains of the ferrite other than the unrecrystallized ferrite becomes extremely small. This is because the crystal orientations of adjacent crystal grains become significantly different due to recrystallization and transformation, but the crystal orientation becomes constant in a single crystal grain. In the KAM method, it is possible to quantitatively indicate the crystal orientation difference with an adjacent pixel (measurement point). In the present invention, when a gap between pixels for which the average crystal orientation difference with an adjacent measurement point is 1° or less and 2° or more is defined as a grain boundary, grains having a crystal grain size of 3 μm or more are defined as the ferrite other than the unrecrystallized ferrite, that is, the recrystallized ferrite and the transformed ferrite.

The EBSP may be measured at ranges of 100 μm×100 μm at a position of ¼ of the thickness of an arbitrary sheet cross section in the thickness direction at measurement intervals of 1/10 of the average crystal grain size of an annealed sample. As a result of the EBSP measurement, the measurement points obtained are output as pixels. The sample provided for the measurement of the crystal orientation of the EBSP is produced by reducing the thickness of a steel sheet to a predetermined thickness through mechanical polishing or the like, subsequently, removing strains through electrolytic polishing or the like, and, simultaneously, making the surface at a position of ¼ of the sheet thickness into a measurement surface.

The total area fraction of the ferrite including the unrecrystallized ferrite is the remainder of the area fraction of the hard second phase. Therefore, the total area fraction of the ferrite can be obtained by etching the sample used for the measurement of the crystal orientation of the EBSP using nital, taking an optical microscopic photo of the same view as used for the measurement at the same magnification, and carrying out an image analysis of the structure photo obtained. Furthermore, it is also possible to obtain the sum of the area fractions of the unrecrystallized ferrite and the ferrite other than the unrecrystallized ferrite, that is, the recrystallized ferrite and the transformed ferrite by comparing the structure photo and the measurement results of the crystal orientation of the EBSP.

When the crystal grain size of the ferrite is less than 5 μm, the yield ratio increases, and the processability deteriorates. On the other hand, when the crystal grain size of the ferrite exceeds 20 μm, the surface appearance deteriorates after the molding, and degradation of the strength may be caused. Therefore, the crystal grain size of the ferrite may be defined in a range of 5 μm to 20 μm.

In addition, the ferrite crystal grain size and the aspect ratio of the ferrite crystal grain are measured by image analyses using the above optical microscope photo. The unrecrystallized ferrite crystal grains generally have a flat and approximately ellipsoidal shape on an optical microscopic photo, and the crystal grains of the recrystallized ferrite or the transformed ferrite have a shape that is more circular and have a lower aspect ratio than the unrecrystallized ferrite grains. The quality of a steel sheet can be improved more stably by controlling the aspect ratios (ratio between the long side and the short side) of the shapes of the crystal grains of the ferrite including the unrecrystallized ferrite, the recrystallized ferrite, and the transformed ferrite. The aspect ratios of the ferrite crystal grains are measured by image analyses of the above optical microscopic photo. That is, a plurality of optical microscopic photos taken at a magnification of 1000 times from ranges of 100 μm×100 μm at a position of ¼ of the thickness of an arbitrary sheet cross section of a nital-etched sample in the thickness direction is prepared. In addition, 300 crystal grains are arbitrarily selected from the above photos, and the grain sizes of the respective crystal grains in the rolling direction and the direction perpendicular to the rolling direction are obtained by image analyses, the ratios of the lengths (=the grain size in the rolling direction/the grain size in the direction perpendicular to the rolling direction) are computed, and used as the aspect ratios. In addition, the diameters of the equivalent circles are obtained and used as the ferrite crystal grain sizes.

In the steel sheet according to the embodiment of the present invention, the ratio of the crystal grains having an aspect ratio of 1.2 or less may be defined to be 60% or more of the total ferrite crystal grains. When the above ratio is maintained, a sufficient amount of the recrystallized ferrite can be guaranteed in the steel sheet, and favorable processability can be obtained. The ratio of the crystal grains having an aspect ratio of 1.2 or less is defined to be more preferably 65% or more of the total ferrite crystal grains, and still more preferably 70% or more.

There is a case in which the hard second phase includes either or both of bainite and residual austenite as well as martensite. The hard second phase contributes to an increase in the strength; however, when present in excess, a decrease in the ductility and an increase in the yield ratio are caused, and therefore the lower limit and the upper limit of the area fraction of the hard second phase are set to 1% and 20% respectively.

In addition, when the area fraction of martensite is less than 3% in the hard second phase, it becomes difficult to reduce the yield ratio to 0.55 or less, and therefore the area fraction is preferably 3% or more.

The microstructure may be observed using an optical microscope after a sample is taken so that the sheet thickness cross section of the sample in parallel with the rolling direction is used as an observation surface, and the observation surface is polished, etched using nital, and etched using a LePera's reagent, if necessary. The total amount of the area fractions of one or more of pearlite, bainite, and martensite can be obtained as the area fraction of phases other than the ferrite by carrying out image analyses of a microstructure photo taken using an optical microscope. It is difficult to differentiate the residual austenite from martensite using an optical microscope, but the volume fraction can be measured by an X-ray diffraction method. Meanwhile, the area fraction as obtained from the microstructure is equivalent to the volume fraction.

When the residual percentage of the hard structures, such as the unrecrystallized ferrite and martensite, is high, the hardness of a steel sheet structure becomes uneven. When the steel sheet is press-molded, plastic deformation locally starts from portions having a relatively low hardness, and therefore the sheet thickness in the rolling direction is liable to become uneven. As a result, streaky recess and protrusion marks are generated on the surface of the steel sheet. For a steel sheet that is used for an automobile outer sheet and the like, the aesthetic appearance of the surface is important, and therefore the streaky recess and protrusion surface defects are considered as serious defects, and a significant decrease in the yield is caused.

In the present invention, an uneven structure hardness, which is a cause of occurrence of streaky recess and protrusion surface defects, is suppressed in order to suppress occurrence of streaky recess and protrusion surface defects.

In the steel sheet according to the embodiment of the present invention, it is enabled to suppress streaky recess and protrusion surface defects and stably produce an automobile steel sheet by paying attention to the area fractions of the unrecrystallized ferrite and the martensite and the aspect ratio of the ferrite crystal grains and controlling the steel structure.

EXAMPLES

Billets obtained by melting and casting steels having the compositions as shown in Table 1 were reheated at 1150° C. to 1250° C., and hot-rolled according to an ordinary method. At this time, the finishing temperature was set to 860° C. to 940° C., and the winding temperature was set to 500° C. to 600° C. After that, cold rolling was carried out at the percentage reductions in thickness as shown in Table 2, annealing, and, furthermore, galvanization were carried out under the conditions as shown in Table 2. Meanwhile, [–] in Table 1 indicates that the analyzed value of a component fell below the detection limit. The underlined numerical values in the respective tables indicate that the numerical values were outside the ranges of the present invention.

TABLE 1

| Steel No. | Component (by mass %) | | | | | | | | | | |
|---|---|---|---|---|---|---|---|---|---|---|---|
| | C | Si | Mn | P | S | Al | Cr | N | Nb | Ti | Mo |
| A | 0.07 | 0.01 | 1.50 | 0.015 | 0.0021 | 0.45 | 1.050 | 0.0022 | — | — | — |
| B | 0.06 | 0.10 | 1.15 | 0.008 | 0.0017 | 0.55 | 0.950 | 0.0029 | 0.010 | — | — |
| C | 0.05 | 0.05 | 1.28 | 0.014 | 0.0022 | 0.25 | 0.350 | 0.0028 | 0.006 | — | 0.12 |

TABLE 1-continued

| Steel No. | C | Si | Mn | P | S | Al | Cr | N | Mo | Ti | Nb |
|---|---|---|---|---|---|---|---|---|---|---|---|
| D | 0.06 | 0.03 | 1.35 | 0.006 | 0.0037 | 0.22 | 0.250 | 0.0018 | — | — | — |
| E | 0.05 | 0.04 | 1.07 | 0.011 | 0.0026 | 0.27 | 0.310 | 0.0025 | — | 0.003 | — |
| F | 0.07 | 0.05 | 1.47 | 0.014 | 0.0034 | 0.26 | 0.220 | 0.0026 | — | — | — |
| G | 0.05 | 0.06 | 1.22 | 0.013 | 0.0031 | 0.20 | 0.300 | 0.0038 | — | — | — |
| H | 0.07 | 0.02 | 1.28 | 0.010 | 0.0030 | 0.11 | 0.400 | 0.0029 | — | — | — |
| I | 0.05 | 0.03 | 1.12 | 0.012 | 0.0033 | 0.12 | 0.470 | 0.0030 | — | — | — |
| J | 0.07 | 0.04 | 1.35 | 0.009 | 0.0036 | 0.10 | 0.430 | 0.0028 | — | — | — |
| K | 0.06 | 0.05 | 1.12 | 0.012 | 0.0033 | 0.48 | 0.070 | 0.0031 | — | — | — |
| L | 0.05 | 0.05 | 1.45 | 0.005 | 0.0029 | 0.50 | 0.550 | 0.0041 | — | — | — |
| M | 0.05 | 0.01 | 1.30 | 0.005 | 0.0021 | 0.60 | 0.850 | 0.0026 | — | — | — |
| N | 0.04 | 0.15 | 1.25 | 0.012 | 0.0028 | 0.35 | 0.700 | 0.0039 | — | — | 0.30 |
| O | 0.04 | 0.30 | 1.35 | 0.011 | 0.0025 | 0.15 | 0.500 | 0.0030 | — | — | — |
| P | 0.03 | 0.05 | 1.50 | 0.009 | 0.0022 | 0.30 | 0.650 | 0.0027 | — | 0.015 | — |
| Q | 0.15 | 0.05 | 0.95 | 0.014 | 0.0015 | 0.50 | 0.350 | 0.0032 | — | — | — |
| R | 0.05 | 0.10 | 0.35 | 0.011 | 0.0023 | 0.50 | 1.200 | 0.0029 | 0.010 | 0.020 | — |
| S | 0.05 | 0.10 | 1.30 | 0.008 | 0.0019 | 0.03 | 0.450 | 0.0025 | — | — | — |
| T | 0.05 | 0.15 | 1.65 | 0.009 | 0.0021 | 0.30 | 0.050 | 0.0023 | — | — | 0.15 |
| U | 0.05 | 0.15 | 1.50 | 0.013 | 0.0024 | 0.40 | 0.300 | 0.0024 | — | — | — |
| V | 0.07 | 0.22 | 1.40 | 0.007 | 0.0034 | 0.38 | 0.170 | 0.0027 | 0.012 | — | — |
| W | 0.05 | 0.01 | 1.20 | 0.012 | 0.0018 | 0.15 | 0.600 | 0.0028 | — | 0.015 | 0.20 |
| X | 0.05 | 0.03 | 1.18 | 0.007 | 0.0022 | 0.25 | 0.005 | 0.0026 | — | — | — |
| Y | 0.06 | 0.02 | 1.45 | 0.006 | 0.0050 | 0.26 | 0.200 | 0.0026 | — | — | — |
| Z | 0.07 | 0.03 | 1.12 | 0.012 | 0.0030 | 0.21 | 1.100 | 0.0020 | — | — | — |
| AA | 0.10 | 0.10 | 2.00 | 0.006 | 0.0018 | 0.03 | 0.180 | 0.0020 | — | — | — |
| AB | 0.07 | 0.13 | 1.45 | 0.009 | 0.0035 | 0.43 | 1.670 | 0.0029 | — | — | — |
| AC | 0.07 | 0.05 | 1.17 | 0.011 | 0.0027 | 0.26 | 0.400 | 0.0120 | — | — | — |

| Steel No. | W | B | Ni | Cu | V | Mn/Cr | Cr/(Si + Al) | Remarks |
|---|---|---|---|---|---|---|---|---|
| A | — | — | — | — | — | 1.43 | 2.28 | Example |
| B | — | — | — | — | — | 1.21 | 1.46 | Example |
| C | — | — | — | — | — | 3.66 | 1.17 | Example |
| D | — | — | — | — | — | 5.40 | 1.00 | Example |
| E | — | 0.00 | — | — | — | 3.45 | 1.00 | Example |
| F | — | — | — | — | — | 6.68 | 0.71 | Example |
| G | — | — | — | — | 0.14 | 3.45 | 1.00 | Example |
| H | — | — | — | — | — | 3.20 | 3.08 | Example |
| I | — | — | — | — | — | 2.38 | 3.13 | Example |
| J | — | 0.00 | — | — | — | 3.14 | 3.07 | Example |
| K | — | 0.00 | — | — | — | 16.00 | 0.13 | Example |
| L | 0.50 | — | — | — | — | 2.64 | 1.00 | Example |
| M | — | — | — | 0.20 | — | 1.53 | 1.39 | Example |
| N | — | — | — | — | — | 1.79 | 1.40 | Example |
| O | — | — | 0.15 | — | — | 2.70 | 1.11 | Comparative example |
| P | — | 0.002 | — | — | — | 2.31 | 1.86 | Example |
| Q | — | — | — | — | — | 2.71 | 0.64 | Comparative example |
| R | — | — | 0.30 | — | — | 0.29 | 2.00 | Comparative example |
| S | 0.30 | — | — | 0.30 | — | 2.89 | 3.46 | Comparative example |
| T | — | 0.001 | — | — | — | 33.00 | 0.11 | Example |
| U | — | — | — | — | — | 5.00 | 0.55 | Example |
| V | — | — | — | — | 0.06 | 8.24 | 0.28 | Comparative example |
| W | — | — | — | — | — | 2.00 | 3.75 | Example |
| X | — | — | — | — | — | 236.00 | 0.02 | Comparative example |
| Y | — | — | — | — | — | 7.25 | 0.71 | Example |
| Z | — | — | — | — | 0.32 | 1.02 | 4.58 | Example |
| AA | — | — | — | — | — | 11.11 | 1.38 | Comparative example |
| AB | — | — | — | — | — | 0.87 | 2.98 | Comparative example |
| AC | — | — | — | — | — | 2.93 | 1.29 | Comparative example |

TABLE 2

| Production No. | Steel No. | Percentage reduction of cold rolling (%) | Annealing process | | | | Overaging treatment temperature (° C.) |
|---|---|---|---|---|---|---|---|
| | | | Heating rate from Ac1 to Ac 3 (° C./s) | Peak temperature (° C.) | Retention time (s) | First cooling rate (° C./s) | |
| 1 | A | 75 | 3 | 800 | 100 | 30 | — |
| 2 | A | 80 | 5 | 800 | 80 | 25 | 350 |
| 3 | A | 80 | 5 | 800 | 80 | 25 | — |
| 4 | A | 75 | 0.5 | 780 | 100 | 30 | — |
| 5 | A | 55 | 5 | 790 | 120 | 20 | 350 |
| 6 | A | 80 | 5 | 800 | 80 | 1 | 300 |
| 7 | B | 75 | 3 | 780 | 100 | 35 | 350 |
| 8 | B | 75 | 3 | 780 | 100 | 35 | — |
| 9 | B | 75 | 5 | 810 | 80 | 30 | — |
| 10 | B | 75 | 30 | 800 | 100 | 25 | — |
| 11 | C | 75 | 3 | 800 | 120 | 15 | — |
| 12 | D | 75 | 5 | 790 | 120 | 10 | — |
| 13 | D | 80 | 3 | 800 | 100 | 30 | 350 |
| 14 | E | 70 | 5 | 810 | 100 | 10 | — |
| 15 | F | 75 | 5 | 800 | 120 | 20 | — |
| 16 | G | 75 | 3 | 800 | 80 | 20 | — |
| 17 | H | 75 | 5 | 800 | 120 | 20 | 350 |
| 18 | I | 80 | 5 | 810 | 100 | 10 | — |
| 19 | J | 77 | 5 | 820 | 80 | 10 | — |
| 20 | K | 80 | 3 | 790 | 100 | 35 | 300 |
| 21 | L | 75 | 3 | 770 | 20 | 30 | — |
| 22 | L | 70 | 3 | 820 | 100 | 30 | 350 |
| 23 | L | 70 | 3 | 820 | 100 | 30 | — |
| 24 | L | 75 | 3 | 700 | 120 | 20 | — |
| 25 | L | 70 | 5 | 790 | 100 | 30 | 350 |
| 26 | M | 75 | 5 | 790 | 80 | 15 | 350 |
| 27 | M | 80 | 5 | 820 | 80 | 10 | — |
| 28 | M | 80 | 5 | 820 | 80 | 10 | 350 |
| 29 | M | 75 | 5 | 870 | 80 | 15 | 350 |
| 30 | M | 70 | 3 | 810 | 100 | 20 | — |
| 31 | N | 75 | 3 | 770 | 120 | 25 | — |
| 32 | N | 75 | 3 | 780 | 100 | 20 | 350 |
| 33 | N | 75 | 3 | 780 | 100 | 20 | — |
| 34 | N | 75 | 5 | 750 | 5 | 20 | — |
| 35 | N | 70 | 3 | 800 | 120 | 30 | — |
| 36 | O | 80 | 5 | 820 | 80 | 5 | 300 |
| 37 | O | 75 | 3 | 790 | 100 | 30 | — |
| 38 | O | 75 | 3 | 790 | 100 | 30 | 300 |
| 39 | O | 75 | 3 | 800 | 80 | 1 | 300 |
| 40 | P | 70 | 5 | 780 | 120 | 20 | — |
| 41 | P | 75 | 5 | 810 | 100 | 30 | 350 |
| 42 | P | 75 | 5 | 810 | 100 | 30 | — |
| 43 | P | 75 | 15 | 800 | 80 | 30 | — |
| 44 | P | 50 | 3 | 800 | 120 | 25 | — |
| 45 | Q | 75 | 3 | 800 | 100 | 20 | 350 |
| 46 | Q | 75 | 3 | 800 | 100 | 20 | — |
| 47 | R | 70 | 3 | 800 | 100 | 20 | — |
| 48 | S | 75 | 5 | 770 | 100 | 20 | — |
| 49 | T | 75 | 3 | 800 | 100 | 20 | 350 |
| 50 | T | 75 | 3 | 800 | 100 | 20 | — |
| 51 | U | 80 | 5 | 780 | 80 | 20 | — |
| 52 | V | 70 | 5 | 800 | 100 | 15 | — |
| 53 | W | 75 | 5 | 790 | 60 | 30 | — |
| 54 | X | 70 | 5 | 810 | 100 | 15 | — |
| 55 | Y | 75 | 5 | 810 | 100 | 30 | 350 |
| 56 | Z | 75 | 5 | 810 | 100 | 30 | — |
| 57 | AA | 55 | 50 | 770 | 10 | 50 | 300 |
| 58 | AB | 75 | 5 | 810 | 100 | 5 | — |
| 59 | AC | 70 | 3 | 800 | 120 | 20 | — |

| Production No. | Overaging time (s) | Galvanizing temperature (° C.) | Alloying treatment temperature (° C.) | Alloying time (s) | Second cooling rate (° C./s) | SPM elongation percentage (%) | Remarks |
|---|---|---|---|---|---|---|---|
| 1 | — | 460 | — | — | 2 | 0.6 | Example |
| 2 | 200 | — | — | — | 2.5 | 0.8 | Example |
| 3 | — | 460 | — | — | 2 | 0.6 | Example |
| 4 | — | 460 | — | — | 2 | 0.6 | Comparative example |
| 5 | 200 | — | — | — | 2.5 | 0.6 | Comparative example |

TABLE 2-continued

| | | | | | | | |
|---|---|---|---|---|---|---|---|
| 6 | 200 | — | — | — | 2.5 | 0.6 | Comparative example |
| 7 | 200 | — | — | — | 2 | 0.6 | Example |
| 8 | — | 460 | 520 | 15 | 2.5 | 0.6 | Example |
| 9 | — | 460 | 520 | 15 | 2.5 | 0.6 | Example |
| 10 | — | 460 | 520 | 15 | 2.5 | 0.6 | Comparative example |
| 11 | — | 460 | 510 | 20 | 2 | 0.8 | Example |
| 12 | — | 460 | 520 | 15 | 2.5 | 0.8 | Example |
| 13 | 200 | — | — | — | 2.5 | 0.8 | Example |
| 14 | — | 460 | 500 | 15 | 2 | 0.4 | Example |
| 15 | — | 460 | 510 | 20 | 2.5 | 1 | Example |
| 16 | — | 460 | 530 | 20 | 2 | 0.8 | Example |
| 17 | 200 | — | — | — | 2 | 0.6 | Example |
| 18 | — | 460 | 520 | 20 | 2.5 | 0.8 | Example |
| 19 | — | 460 | 520 | 15 | 2.5 | 0.6 | Example |
| 20 | 250 | — | — | — | 2 | 1 | Example |
| 21 | — | 460 | 520 | 20 | 2 | 0.6 | Example |
| 22 | 200 | — | — | — | 2.5 | 0.8 | Example |
| 23 | — | 460 | 520 | 20 | 2 | 0.6 | Example |
| 24 | — | 460 | 520 | 20 | 2 | 0.6 | Comparative example |
| 25 | 200 | — | — | — | 2 | 2.2 | Comparative example |
| 26 | 200 | — | — | — | 2.5 | 0.6 | Example |
| 27 | — | 460 | 520 | 15 | 2.5 | 0.6 | Example |
| 28 | 200 | — | — | — | 2.5 | 0.6 | Example |
| 29 | 200 | — | — | — | 2.5 | 0.6 | Comparative example |
| 30 | — | 460 | 520 | 15 | 5 | 0.4 | Example |
| 31 | — | 460 | 540 | 15 | 2.5 | 0.6 | Example |
| 32 | 200 | — | — | — | 2 | 1 | Example |
| 33 | — | 460 | 540 | 15 | 2.5 | 0.6 | Example |
| 34 | — | 460 | 540 | 15 | 2 | 0.6 | Comparative example |
| 35 | — | 460 | 520 | 20 | 0.5 | 0.6 | Example |
| 36 | 250 | — | — | — | 2.5 | 0.6 | Comparative example |
| 37 | — | 460 | 540 | 15 | 2 | 0.8 | Comparative example |
| 38 | 250 | — | — | — | 2.5 | 0.6 | Comparative example |
| 39 | 250 | — | — | — | 2.5 | 0.6 | Comparative example |
| 40 | — | 460 | 500 | 20 | 2.5 | 0.6 | Example |
| 41 | 200 | — | — | — | 2 | 0.4 | Example |
| 42 | — | 460 | 500 | 20 | 2.5 | 0.6 | Example |
| 43 | — | 460 | 500 | 20 | 2.5 | 0.6 | Comparative example |
| 44 | — | 460 | 500 | 20 | 2.5 | 0.8 | Comparative example |
| 45 | 200 | — | — | — | 2 | 0.6 | Comparative example |
| 46 | — | 460 | 520 | 15 | 2.5 | 0.6 | Comparative example |
| 47 | — | 460 | 520 | 15 | 2.5 | 0.6 | Comparative example |
| 48 | — | 460 | 520 | 15 | 2.5 | 0.6 | Comparative example |
| 49 | 200 | — | — | — | 2 | 0.6 | Example |
| 50 | — | 460 | 520 | 15 | 2.5 | 0.6 | Example |
| 51 | — | 460 | 520 | 15 | 2.5 | 0.6 | Example |
| 52 | — | 460 | 540 | 15 | 2.5 | 1 | Comparative example |
| 53 | — | 460 | 520 | 15 | 2 | 0.6 | Example |
| 54 | — | 460 | 500 | 20 | 2.5 | 0.6 | Comparative example |
| 55 | 200 | — | — | — | 2 | 0.6 | Example |
| 56 | — | 460 | 500 | 20 | 2.5 | 0.4 | Example |
| 57 | 250 | — | — | — | 2.5 | 0.6 | Comparative example |
| 58 | — | 460 | 540 | 20 | 3 | 0.6 | Comparative example |
| 59 | — | 450 | 510 | 20 | 2.5 | 0.6 | Comparative example |

A tensile test specimen according to JIS Z 2201 No. 5 was taken from a steel sheet that had undergone cold rolling after being produced considering the width direction (referred to as the TD direction) as the longitudinal direction, and the tensile characteristics in the TD direction were evaluated according to JIS Z 2241. In addition, a tight bending test was carried out by a winding bend method under conditions of the internal radius set to zero and the bending angle set to 180° using a test specimen according to JIS Z 2248 No. 3, and the surface of the test specimen was visually observed. In the bending test, in a case in which cracking did not occur in the steel sheet, and fissures and other defects were not found in the visual observation, the tight bending processability was evaluated to be favorable, and, in a case in which cracking occurred in the steel sheet, and fissures and other defects were visually found in the visual observation, the tight bending processability was evaluated to be poor.

The microstructure of the sheet thickness cross section of the steel sheet was observed using an optical microscope after a sample was taken so that the rolling direction was used as an observation surface, and etched by a LePera method. The area fraction of the hard second phase was obtained as the sum of phases other than the ferrite by carrying out image analyses of a microstructure photo taken using an optical microscope. In addition, the area fraction of the unrecrystallized ferrite and the area fraction of the remainder, that is, the ferrite excluding the unrecrystallized ferrite were obtained by measuring the crystal orientation of the EBSP, checking the measurement results and the optical microscopic structure photo, and carrying out image analyses.

The ferrite grain sizes, the average values of the aspect ratios of the ferrite grains, and the fractions of the ferrite grains having an aspect ratio of 1.2 or less were obtained by image analyses of structure photos taken using the above optical microscope.

The analysis results are shown in Table 3.

TABLE 3

| Production No. | Steel No. | Ferrite area fraction (%) | Unrecrystallized ferrite area fraction (%) | Ferrite grain size (μm) | Average aspect ratio | Aspect ratio of 1.2 or less | Hard second phase area | Martensite are fraction (%) | Other hard second phases |
|---|---|---|---|---|---|---|---|---|---|
| 1 | A | 87 | 0 | 8 | 1.1 | 75 | 13 | 7 | 6 |
| 2 | A | 88 | 1 | 8 | 1.15 | 75 | 12 | 7 | 5 |
| 3 | A | 88 | 1 | 8 | 1.15 | 75 | 12 | 7 | 5 |
| 4 | A | 90 | 0 | 22 | 1.05 | 85 | 10 | 6 | 4 |
| 5 | A | 88 | 20 | 5 | 2 | 50 | 12 | 7 | 5 |
| 6 | A | 85 | 1 | 9 | 1.15 | 60 | 15 | 2 | 13 |
| 7 | B | 90 | 3 | 7 | 1.1 | 70 | 10 | 5 | 5 |
| 8 | B | 90 | 3 | 7 | 1.1 | 70 | 10 | 5 | 5 |
| 9 | B | 89 | 4 | 7 | 1.15 | 70 | 11 | 6 | 5 |
| 10 | B | 90 | 25 | 4 | 2.5 | 50 | 10 | 7 | 3 |
| 11 | C | 90 | 1 | 8 | 1.1 | 65 | 10 | 6 | 4 |
| 12 | D | 88 | 0 | 13 | 1.15 | 70 | 12 | 5 | 7 |
| 13 | D | 90 | 2 | 11 | 1.15 | 70 | 10 | 4 | 6 |
| 14 | E | 91 | 1 | 9 | 1.1 | 70 | 9 | 4 | 5 |
| 15 | F | 90 | 2 | 11 | 1.15 | 70 | 10 | 4 | 6 |
| 16 | G | 90 | 1 | 7 | 1.2 | 65 | 10 | 6 | 4 |
| 17 | H | 89 | 2 | 8 | 1.15 | 75 | 11 | 4 | 7 |
| 18 | I | 91 | 0 | 8 | 1.2 | 75 | 9 | 3 | 6 |
| 19 | J | 87 | 2 | 7 | 1.15 | 75 | 13 | 4 | 9 |
| 20 | K | 86 | 0 | 10 | 1.1 | 70 | 14 | 7 | 7 |
| 21 | L | 91 | 0 | 9 | 1.1 | 85 | 9 | 5 | 4 |
| 22 | L | 86 | 0 | 8 | 1.1 | 75 | 14 | 8 | 6 |
| 23 | L | 86 | 0 | 8 | 1.1 | 75 | 14 | 8 | 6 |
| 24 | L | 98 | 0 | 9 | 1.1 | 90 | 2 | 2 | 0 |
| 25 | L | 87 | 0 | 8 | 1.15 | 85 | 13 | 7 | 6 |
| 26 | M | 89 | 1 | 8 | 1.15 | 75 | 11 | 6 | 5 |
| 27 | M | 88 | 0 | 7 | 1.15 | 75 | 12 | 5 | 7 |
| 28 | M | 88 | 0 | 7 | 1.15 | 75 | 12 | 5 | 7 |
| 29 | M | 70 | 0 | 7 | 1.15 | 60 | 30 | 9 | 21 |
| 30 | M | 86 | 0 | 8 | 1.15 | 75 | 14 | 8 | 6 |
| 31 | N | 88 | 1 | 8 | 1.1 | 75 | 12 | 6 | 6 |
| 32 | N | 87 | 1 | 7 | 1.1 | 75 | 13 | 7 | 6 |
| 33 | N | 87 | 1 | 7 | 1.1 | 75 | 13 | 7 | 6 |
| 34 | N | 96 | 2 | 6 | 1.3 | 55 | 4 | 2 | 2 |
| 35 | N | 95 | 0 | 7 | 1.15 | 75 | 5 | 3 | 2 |
| 36 | O | 87 | 0 | 8 | 1.55 | 55 | 13 | 4 | 9 |
| 37 | O | 88 | 0 | 8 | 1.55 | 55 | 12 | 6 | 6 |
| 38 | O | 88 | 0 | 8 | 1.55 | 55 | 12 | 6 | 6 |
| 39 | O | 91 | 0 | 9 | 1.45 | 60 | 9 | 2 | 7 |
| 40 | P | 89 | 3 | 6 | 1.15 | 70 | 11 | 5 | 6 |
| 41 | P | 87 | 1 | 6 | 1.15 | 70 | 13 | 6 | 7 |
| 42 | P | 87 | 1 | 6 | 1.15 | 70 | 13 | 6 | 7 |
| 43 | P | 89 | 12 | 6 | 1.8 | 55 | 11 | 6 | 5 |
| 44 | P | 88 | 15 | 5 | 1.9 | 50 | 12 | 6 | 6 |
| 45 | Q | 78 | 0 | 7 | 1.1 | 60 | 22 | 10 | 12 |
| 46 | Q | 78 | 0 | 7 | 1.1 | 60 | 22 | 10 | 12 |
| 47 | R | 86 | 5 | 5 | 1.35 | 55 | 14 | 2 | 12 |
| 48 | S | 75 | 1 | 8 | 1.15 | 60 | 25 | 4 | 21 |
| 49 | T | 87 | 1 | 8 | 1.15 | 75 | 13 | 2 | 11 |

TABLE 3-continued

| | | | | | | | | | |
|---|---|---|---|---|---|---|---|---|---|
| 50 | T | 87 | 1 | 8 | 1.15 | 75 | 13 | 2 | 11 |
| 51 | U | 88 | 0 | 7 | 1.15 | 75 | 12 | 2 | 10 |
| 52 | V | 91 | 3 | 4 | 1.2 | 65 | 9 | 3 | 6 |
| 53 | W | 81 | 1 | 8 | 1.15 | 60 | 19 | 3 | 16 |
| 54 | X | 79 | 0 | 10 | 1.15 | 80 | 21 | 4 | 17 |
| 55 | Y | 88 | 0 | 9 | 1.15 | 75 | 12 | 5 | 7 |
| 56 | Z | 86 | 0 | 8 | 1.15 | 75 | 14 | 8 | 6 |
| 57 | AA | 65 | 25 | 4 | 2.8 | 35 | 35 | 20 | 15 |
| 58 | AB | 76 | 1 | 11 | 1.25 | 60 | 24 | 15 | 9 |
| 59 | AC | 85 | 3 | 4 | 1.15 | 70 | 15 | 5 | 10 |

| | Mechanical characteristics | | | | | | Paint bake hardenability | | |
|---|---|---|---|---|---|---|---|---|---|
| Production No. | YS (MPa) | TS (MPa) | YR | El (%) | TS × El (MPa · %) | Tight bending processability | BH amount (MPa) | Strain aging YS (MPa) | Remarks |
| 1 | 229 | 456 | 0.5 | 39 | 17784 | Favorable | 60 | 375 | Example |
| 2 | 223 | 452 | 0.49 | 40 | 18080 | Favorable | 59 | 370 | Example |
| 3 | 220 | 453 | 0.49 | 41 | 18573 | Favorable | 65 | 380 | Example |
| 4 | 201 | 385 | 0.52 | 44 | 16940 | Favorable | 58 | 360 | Comparative example |
| 5 | 290 | 475 | 0.61 | 34 | 16150 | Favorable | 62 | 360 | Comparative example |
| 6 | 296 | 448 | 0.66 | 36 | 16128 | Favorable | 43 | 378 | Comparative example |
| 7 | 231 | 447 | 0.52 | 40 | 17880 | Favorable | 66 | 380 | Example |
| 8 | 221 | 447 | 0.49 | 41 | 18327 | Favorable | 58 | 373 | Example |
| 9 | 236 | 451 | 0.52 | 40 | 18040 | Favorable | 57 | 381 | Example |
| 10 | 351 | 483 | 0.73 | 33 | 15939 | Poor | 62 | 418 | Comparative example |
| 11 | 253 | 453 | 0.56 | 39 | 17667 | Favorable | 51 | 358 | Example |
| 12 | 262 | 462 | 0.57 | 38 | 17556 | Favorable | 57 | 382 | Example |
| 13 | 258 | 464 | 0.56 | 39 | 18096 | Favorable | 59 | 386 | Example |
| 14 | 254 | 456 | 0.56 | 39 | 17784 | Favorable | 53 | 363 | Example |
| 15 | 270 | 470 | 0.57 | 37 | 17390 | Favorable | 55 | 377 | Example |
| 16 | 257 | 460 | 0.56 | 40 | 18400 | Favorable | 50 | 363 | Example |
| 17 | 269 | 483 | 0.56 | 36 | 17388 | Favorable | 67 | 404 | Example |
| 18 | 268 | 456 | 0.59 | 38 | 17328 | Favorable | 54 | 371 | Example |
| 19 | 269 | 475 | 0.57 | 37 | 17575 | Favorable | 56 | 372 | Example |
| 20 | 270 | 477 | 0.57 | 38 | 18126 | Favorable | 62 | 389 | Example |
| 21 | 234 | 448 | 0.52 | 39 | 17472 | Favorable | 60 | 371 | Example |
| 22 | 220 | 472 | 0.47 | 38 | 17936 | Favorable | 66 | 375 | Example |
| 23 | 222 | 471 | 0.47 | 37 | 17427 | Favorable | 64 | 370 | Example |
| 24 | 245 | 426 | 0.58 | 38 | 16188 | Favorable | 51 | 368 | Comparative example |
| 25 | 285 | 455 | 0.63 | 35 | 15925 | Favorable | 30 | 320 | Comparative example |
| 26 | 222 | 446 | 0.49 | 39 | 17394 | Favorable | 59 | 365 | Example |
| 27 | 241 | 455 | 0.53 | 38 | 17290 | Favorable | 54 | 363 | Example |
| 28 | 236 | 452 | 0.52 | 38 | 17176 | Favorable | 60 | 367 | Example |
| 29 | 310 | 520 | 0.6 | 32 | 16640 | Favorable | 65 | 396 | Comparative example |
| 30 | 252 | 475 | 0.53 | 35 | 16625 | Favorable | 51 | 360 | Example |
| 31 | 222 | 449 | 0.49 | 39 | 17511 | Favorable | 58 | 372 | Example |
| 32 | 233 | 453 | 0.51 | 38 | 17214 | Favorable | 63 | 380 | Example |
| 33 | 225 | 452 | 0.5 | 38 | 17176 | Favorable | 61 | 378 | Example |
| 34 | 253 | 431 | 0.59 | 36 | 15516 | Favorable | 48 | 380 | Comparative example |
| 35 | 255 | 435 | 0.59 | 36 | 15660 | Favorable | 40 | 320 | Example |
| 36 | 241 | 450 | 0.54 | 38 | 17100 | Poor | 60 | 373 | Comparative example |
| 37 | 230 | 447 | 0.51 | 38 | 16986 | Poor | 60 | 375 | Comparative example |
| 38 | 227 | 448 | 0.51 | 39 | 17472 | Poor | 60 | 375 | Comparative example |
| 39 | 275 | 442 | 0.62 | 36 | 15912 | Poor | 52 | 391 | Comparative example |
| 40 | 238 | 450 | 0.53 | 38 | 17100 | Favorable | 58 | 377 | Example |
| 41 | 249 | 451 | 0.55 | 38 | 17138 | Favorable | 67 | 385 | Example |
| 42 | 236 | 452 | 0.52 | 38 | 17176 | Favorable | 59 | 374 | Example |
| 43 | 280 | 460 | 0.61 | 35 | 16100 | Poor | 57 | 401 | Comparative example |
| 44 | 295 | 470 | 0.63 | 34 | 15980 | Poor | 55 | 360 | Comparative example |
| 45 | 291 | 511 | 0.57 | 30 | 15330 | Poor | 66 | 407 | Comparative example |

TABLE 3-continued

| | | | | | | | | | |
|---|---|---|---|---|---|---|---|---|---|
| 46 | 295 | 510 | 0.58 | 30 | 15300 | Favorable | 63 | 408 | Comparative example |
| 47 | 310 | 445 | 0.7 | 34 | 15130 | Favorable | 50 | 420 | Comparative example |
| 48 | 285 | 473 | 0.6 | 33 | 15609 | Favorable | 58 | 388 | Comparative example |
| 49 | 284 | 448 | 0.63 | 35 | 15680 | Favorable | 49 | 381 | Example |
| 50 | 289 | 449 | 0.64 | 35 | 15715 | Favorable | 50 | 387 | Example |
| 51 | 279 | 452 | 0.62 | 34 | 15368 | Favorable | 52 | 392 | Example |
| 52 | 256 | 447 | 0.57 | 35 | 15645 | Poor | 55 | 366 | Comparative example |
| 53 | 283 | 469 | 0.6 | 34 | 15946 | Favorable | 53 | 391 | Example |
| 54 | 305 | 442 | 0.69 | 35 | 15470 | Favorable | 35 | 355 | Comparative example |
| 55 | 295 | 462 | 0.64 | 34 | 15708 | Favorable | 64 | 410 | Example |
| 56 | 249 | 448 | 0.56 | 37 | 16576 | Favorable | 60 | 365 | Example |
| 57 | 510 | 840 | 0.61 | 18 | 15120 | Poor | 72 | 610 | Comparative example |
| 58 | 296 | 520 | 0.57 | 32 | 16840 | Poor | 85 | 420 | Comparative example |
| 59 | 289 | 495 | 0.79 | 34 | 16830 | Poor | 25 | 484 | Comparative example |

The yield strength and the yield ratio have a strong correlation with the processability, particularly, the press moldability, and the processability of a steel sheet having a yield strength of more than 270 MPa and a yield ratio of more than 0.55 is not sufficient. Therefore, the favorable upper limits of the yield strength and the yield ratio are set to 270 MPa or less and 0.55 or less respectively.

The yield strength (hereinafter also referred to simply as the strain aging yield strength) and the BH amount of a steel sheet when resubjected to tension after addition of a 2% tensile pre-strain and then aging at 170° C. for 1200 seconds have a positive correlation with the dent resistance of a member that has been subjected to molding and, furthermore, a paint baking treatment, and refer to the strain aging yield load and the BH amount measured according to the method of a paint bake hardening test as described in the appendix of JIS G 3135. In a case in which the BH amount is less than 50 MPa and the strain aging yield strength is less than 330 MPa, there is a case in which the thickness of the steel sheet cannot be sufficiently reduced from the viewpoint of the dent resistance. Therefore, the BH amount and the strain aging yield strength are favorably set to 50 MPa or more and 330 MPa or more respectively.

The strength-ductility balance TS×E1 [MPa·%] is an index of moldability, and, when the strength-ductility balance TS×E1 [MPa·%] is less than 17000, there is a case in which a steel sheet is ruptured during molding, and therefore the strength-ductility balance TS×E1 [MPa·%] is preferably 17000 or more. The strength-ductility balance TS×E1 [MPa·%] is more preferably 17500 or more in order to prevent a steel sheet from rupturing under stricter molding conditions.

As shown in Table 3, the result is that it is possible to obtain a high-strength galvanized steel sheet that has a low yield strength, a low yield ratio, favorable tight bending processability, and excellent strength-ductility balance by subjecting steel having the chemical components of the present invention to hot rolling and cold rolling under appropriate conditions, and, furthermore, annealing under appropriate conditions.

For Steel O, since the Si amount is large, and the aspect ratio of the ferrite crystal grains is large, the tight bending processability becomes poor.

For Steel Q, since the C amount is large, the ferrite area fraction is low, and the yield strength and the yield ratio are high.

For Steel R, since the Mn amount is small, the martensite amount is decreased, and the yield strength and the yield ratio are high.

For Steel S, since the Al amount is small, the ferrite area fraction is low, and the yield strength and the yield ratio are high.

For Steel V, since the Si amount is large, the tight bending processability becomes poor.

For Steel X, since the Cr amount is small, the martensite amount is decreased, and the yield strength and the yield ratio are high.

Steel AA has substantially the same composition as Steel 1 in Patent Document 6, a large Mn amount, and a low Al amount, and therefore the ferrite area fraction is small. In addition, in Production No. 57 that was carried out according to the method as described in Patent Document 6 using Steel AA, since the percentage reduction in thickness of the cold rolling is small, the amount of the unrecrystallized ferrite is large. Therefore, the yield strength and the yield ratio are high.

For Steel AB, since the Cr amount is large, the martensite amount is increased, and the tensile strength and the yield strength are high.

For Steel AC, since the N amount is large, the yield strength and the yield ratio are high.

For Production No. 4, the heating rate from the Ac1 transformation point to the Ac3 transformation point is slow in the annealing, and the crystal grain size of the ferrite is large. Therefore, the tensile strength is low, and the TS×E1 is low.

For Production No. 5, since the percentage reduction in thickness of the cold rolling is small, the amount of the unrecrystallized ferrite is large. Therefore, the yield strength and the yield ratio are high.

For Production No. 6, the cooling rate is temporarily slow. Therefore, the martensite amount is decreased, and the yield strength and the yield ratio are high.

For Production No. 10, since the heating rate is fast in the annealing, the fraction of the unrecrystallized ferrite is large, the aspect ratio of the ferrite grains is large, and the crystal grain size of the ferrite is refined. Therefore, the yield strength and the yield ratio are high.

For Production No. 24, since the peak temperature is low in the annealing, and the martensite amount is small, the tensile strength is low.

For Production No. 25, since the percentage reduction in thickness of the skin pass is large, the BH amount is small.

For Production No. 29, since the peak temperature is high in the annealing, the fraction of the hard second phase is large, and the yield strength and the yield ratio are high.

For Production No. 34, since the retention time at the peak temperature is short in the annealing, the martensite amount is small, and the aspect ratio of the ferrite crystal grains is large, and therefore the yield ratio is large.

For Production No. 43, since the heating rate is fast in the annealing, the fraction of the unrecrystallized ferrite is large, and the yield strength and the yield ratio are high.

For Production No. 44, since the percentage reduction in thickness of the cold rolling is small, the fraction of the unrecrystallized ferrite is large, and the yield strength and the yield ratio are high.

INDUSTRIAL APPLICABILITY

According to the respective aspects of the present invention, it become possible to provide a steel sheet that has a tensile strength of 390 MPa to 500 MPa, has a low yield strength and a low yield ratio, has excellent strength-ductility balance, and has paint bake hardenability, which makes an extremely significant contribution to the industry. Furthermore, the present invention makes it possible to reduce, particularly, the sheet thickness of an outer panel of an automobile for which excellent processability, particularly, press moldability, paint bake hardenability, and surface quality are required, and thus exhibits an extremely noticeable effect that significantly contributes to a decrease in the weight of an automobile body and the like. In addition, it is possible to stably suppress occurrence of streaky recess and protrusion surface defects and to significantly improve the yield of a high-strength steel sheet.

The invention claimed is:

1. A high-strength steel sheet comprising, by mass %:
C: 0.01% to 0.10%;
Si: 0.15% or less;
Mn: 0.80% to 1.50%;
P: 0.10% or less;
S: 0.015% or less;
Al: more than 0.20% to 0.80%;
Cr: 0.01% to 0.40%;
N: 0.0100% or less; and
a balance consisting of iron and unavoidable impurities, wherein:
a metallic structure is composed of ferrite and a hard second phase;
an area fraction of the ferrite is 80% or more;
an area fraction of the hard second phase is 1% to 20%;
a fraction of unrecrystallized ferrite in the ferrite is less than 10%;
ferrite grain sizes are 5 μm to 20 μm; and
a fraction of ferrite crystal grains having an aspect ratio of 1.2 or less in entire ferrite crystal grains is 60% or more.

2. The high-strength steel sheet according to claim 1, wherein a component composition of the high-strength steel sheet satisfies
Mn/Cr is 3.0 or less, and
Cr/(Si+Al) is 3.0 or less.

3. The high-strength steel sheet according to claim 1, further comprising, by mass %, one or more of:
Nb: 0.0005% to 0.0500%;
Ti: 0.0005% to 0.0500%;
Mo: 0.005% to 1.500%;
W: 0.005% to 1.500%;
B: 0.0001% to 0.0100%;
Ni: 0.005% to 1.500%;
Cu: 0.005% to 1.500%; and
V: 0.005% to 1.500%.

4. The high-strength steel sheet according to claim 1, wherein a zinc galvanization coat or a zinc alloy galvanization coat is provided at a surface of the high-strength steel sheet.

5. The high-strength steel sheet according to claim 4, wherein the high-strength steel sheet further comprises Cr: 0.20% to 0.40%, and P: less than 0.015%.

6. A method for producing a high-strength steel sheet, wherein a billet having chemical components of the high-strength steel sheet according to claim 1 is hot rolled, pickled, cold rolled at a percentage reduction in a thickness of more than 60% so as to obtain a steel sheet,
then, the steel sheet is heated to a temperature range of 720° C. to 850° C. at a heating rate controlled to 1° C./s to 10° C./s in a temperature range of an $Ac_1$ transformation point to an $Ac_3$ transformation point, and subjected to an annealing for a retention time of 10 seconds to 200 seconds during which a temperature of the steel sheet is 720° C. to 850° C., and
after the annealing, the steel sheet is subjected to a first cooling to 500° C. or lower at a cooling rate of 3° C./s or more, and then subjected to a skin pass rolling of 2.0% or less.

7. The method for producing the high-strength steel sheet according to claim 6, wherein a heat treatment is carried out in a temperature range of 200° C. to 450° C. for 30 seconds or more before the skin pass rolling, and
a second cooling is carried out at a cooling rate of 1° C./s to 3° C./s to 100° C. or lower after the heat treatment.

8. The method for producing the high-strength steel sheet according to claim 6, wherein galvanization is carried out on the steel sheet after the first cooling and before the skin pass rolling.

9. The method for producing the high-strength steel sheet according to claim 8, wherein a heat treatment for alloying is carried out for 10 seconds or longer in a temperature range of 450° C. to 600° C. at a timing after the galvanization and before the skin pass rolling.

10. The method for producing the high-strength steel sheet according to claim 7, wherein the galvanization is carried out on the steel sheet at a timing after the heat treatment and before the second cooling.

11. The method for producing the high-strength steel sheet according to claim 10, wherein the heat treatment for alloying is carried out for 10 seconds or longer in a temperature range of 450° C. to 600° C. at a timing after the galvanization and before the second cooling.

12. The high-strength steel sheet according to claim 2, further comprising, by mass %, one or more of:
Nb: 0.0005% to 0.0500%;
Ti: 0.0005% to 0.0500%;
Mo: 0.005% to 1.500%;
W: 0.005% to 1.500%;
B: 0.0001% to 0.0100%;
Ni: 0.005% to 1.500%;
Cu: 0.005% to 1.500%; and
V: 0.005% to 1.500%.

13. The high-strength steel sheet according to claim 2, wherein a zinc galvanization coat or a zinc alloy galvanization coat is provided at a surface of the high-strength steel sheet.

14. The high-strength steel sheet according to claim 3, wherein a zinc galvanization coat or a zinc alloy galvanization coat is provided at a surface of the high-strength steel sheet.

15. The high-strength steel sheet according to claim 12, wherein a zinc galvanization coat or a zinc alloy galvanization coat is provided at a surface of the high-strength steel sheet.

16. The high-strength steel sheet according to claim 13, wherein the high-strength steel sheet further comprises Cr: 0.20% to 0.40%, and P: less than 0.015%.

17. The high-strength steel sheet according to claim 14, wherein the high-strength steel sheet further comprises Cr: 0.20% to 0.40%, and P: less than 0.015%.

18. The high-strength steel sheet according to claim 15, wherein the high-strength steel sheet further comprises Cr: 0.20% to 0.40%, and P: less than 0.015%.

19. A method for producing a high-strength steel sheet, wherein a billet having chemical components of the high-strength steel sheet according to claim 2 is hot rolled, pickled, cold rolled at a percentage reduction in a thickness of more than 60% so as to obtain a steel sheet, then, the steel sheet is heated to a temperature range of 720° C. to 850° C. at a heating rate controlled to 1° C./s to 10° C./s in a temperature range of an $Ac_1$ transformation point to an $Ac_3$ transformation point, and subjected to an annealing for a retention time of 10 seconds to 200 seconds during which a temperature of the steel sheet is 720° C. to 850° C., and after the annealing, the steel sheet is subjected to a first cooling to 500° C. or lower at a cooling rate of 3° C./s or more, and then subjected to a skin pass rolling of 2.0% or less.

20. A method for producing a high-strength steel sheet, wherein a billet having chemical components of the high-strength steel sheet according to claim 3 is hot rolled, pickled, cold rolled at a percentage reduction in a thickness of more than 60% so as to obtain a steel sheet, then, the steel sheet is heated to a temperature range of 720° C. to 850° C. at a heating rate controlled to 1° C./s to 10° C./s in a temperature range of an $Ac_1$ transformation point to an $Ac_3$ transformation point, and subjected to an annealing for a retention time of 10 seconds to 200 seconds during which a temperature of the steel sheet is 720° C. to 850° C., and after the annealing, the steel sheet is subjected to a first cooling to 500° C. or lower at a cooling rate of 3° C./s or more, and then subjected to a skin pass rolling of 2.0% or less.

21. A method for producing a high-strength steel sheet, wherein a billet having chemical components of the high-strength steel sheet according to claim 12 is hot rolled, pickled, cold rolled at a percentage reduction in a thickness of more than 60% so as to obtain a steel sheet, then, the steel sheet is heated to a temperature range of 720° C. to 850° C. at a heating rate controlled to 1° C./s to 10° C./s in a temperature range of an $Ac_1$ transformation point to an $Ac_3$ transformation point, and subjected to an annealing for a retention time of 10 seconds to 200 seconds during which a temperature of the steel sheet is 720° C. to 850° C., and after the annealing, the steel sheet is subjected to a first cooling to 500° C. or lower at a cooling rate of 3° C./s or more, and then subjected to a skin pass rolling of 2.0% or less.

22. The method for producing the high-strength steel sheet according to claim 19, wherein a heat treatment is carried out in a temperature range of 200° C. to 450° C. for 30 seconds or more before the skin pass rolling, and a second cooling is carried out at a cooling rate of 1° C./s to 3° C./s to 100° C. or lower after the heat treatment.

23. The method for producing the high-strength steel sheet according to claim 20, wherein a heat treatment is carried out in a temperature range of 200° C. to 450° C. for 30 seconds or more before the skin pass rolling, and a second cooling is carried out at a cooling rate of 1° C./s to 3° C./s to 100° C. or lower after the heat treatment.

24. The method for producing the high-strength steel sheet according to claim 21, wherein a heat treatment is carried out in a temperature range of 200° C. to 450° C. for 30 seconds or more before the skin pass rolling, and a second cooling is carried out at a cooling rate of 1° C./s to 3° C./s to 100° C. or lower after the heat treatment.

25. The method for producing the high-strength steel sheet according to claim 19, wherein galvanization is carried out on the steel sheet after the first cooling and before the skin pass rolling.

26. The method for producing the high-strength steel sheet according to claim 20, wherein galvanization is carried out on the steel sheet after the first cooling and before the skin pass rolling.

27. The method for producing the high-strength steel sheet according to claim 21, wherein galvanization is carried out on the steel sheet after the first cooling and before the skin pass rolling.

* * * * *